(12) United States Patent
Rekers

(10) Patent No.: US 6,251,275 B1
(45) Date of Patent: Jun. 26, 2001

(54) MEMBRANE FILTRATION MODULE AND MEMBRANE FILTRATION SYSTEM

(75) Inventor: Casper J. N. Rekers, Hardenberg (NL)

(73) Assignee: X-Flow B.V., Almelo (NL)

(*) Notice: Subject to any disclaimer, the term of this patent is extended or adjusted under 35 U.S.C. 154(b) by 0 days.

(21) Appl. No.: 09/033,885

(22) Filed: Mar. 3, 1998

(30) Foreign Application Priority Data

Mar. 4, 1997 (NL) .................................................. 1005430

(51) Int. Cl.[7] .......................... B01D 63/02; B01D 63/04; B01D 63/06; B01D 65/02
(52) U.S. Cl. ................................ 210/321.78; 210/321.79; 210/321.8; 210/321.87; 210/321.88; 210/321.89; 210/340; 210/433.1; 210/435; 210/500.23
(58) Field of Search .......................... 210/321.65, 321.6, 210/321.79, 321.8, 321.88, 321.89, 340, 341, 433.1, 434, 435, 437, 500.23, 321.78, 321.87

(56) References Cited

U.S. PATENT DOCUMENTS

| | | | |
|---|---|---|---|
| 3,827,564 | 8/1974 | Rak | 210/494 |
| 4,045,851 | * 9/1977 | Ashara et al. | 210/321.79 |
| 4,062,771 | * 12/1977 | Saupe | 210/321.6 |
| 4,666,469 | 5/1987 | Krueger et al. | |
| 4,767,533 | 8/1988 | Fisher et al. | 210/321.64 |
| 4,971,689 | * 11/1990 | Burrows | 210/321.65 |
| 5,470,468 | * 11/1995 | Colby | 210/321.6 |
| 5,470,469 | * 11/1995 | Eckman | 210/321.8 |
| 5,545,320 | 8/1996 | Heine et al. | 210/321.6 |
| 5,906,739 | * 5/1999 | Osterland et al. | 310/321.81 |

FOREIGN PATENT DOCUMENTS

| | | |
|---|---|---|
| 0 188 224 | 7/1986 | (EP) . |
| 0 203 489 | 12/1986 | (EP) . |
| 0 282 355 | 9/1988 | (EP) . |
| 0 668 097A2 | 8/1995 | (EP) . |
| 7415082 | 5/1976 | (NL) . |
| 7905957 | 9/1980 | (NL) . |
| 1003309 | 7/1996 | (NL) . |
| WO98/20962 | 11/1996 | (WO) . |

* cited by examiner

*Primary Examiner*—John Kim
(74) *Attorney, Agent, or Firm*—Akerman Senterfitt

(57) ABSTRACT

A membrane filtration module, comprising a housing, a semi-permeable membrane, which is accommodated in the housing and has a liquid side for the introduction of liquid to be filtered and a concentrate side opposite the liquid side, as well as a permeate chamber, which surrounds the membrane and is in communication with a permeate-discharge line for discharging permeate. According to the invention, the wall of the housing comprises one or more channels which are closed towards the liquid side and the concentrate side and are in communication with the permeate chamber. These channels act as a permeate discharge.

11 Claims, 4 Drawing Sheets

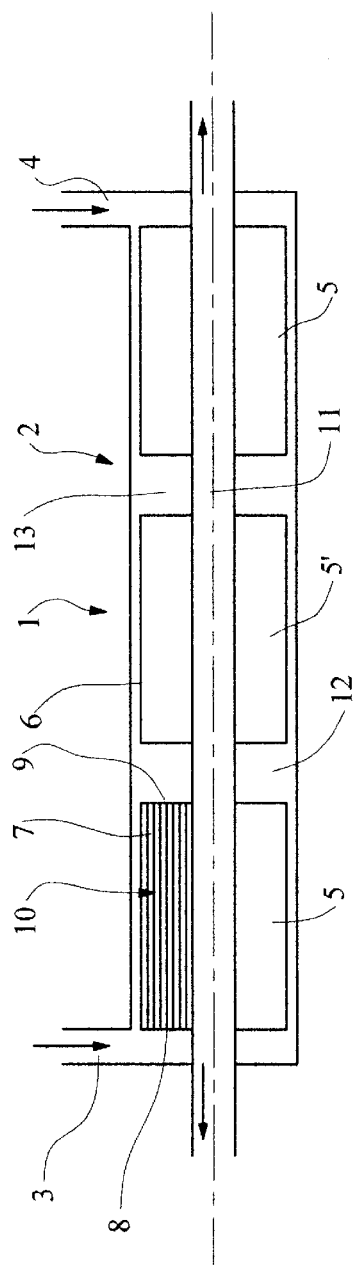
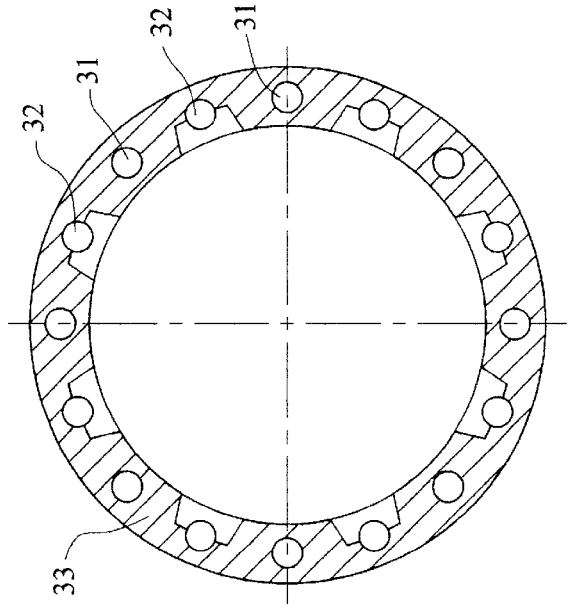
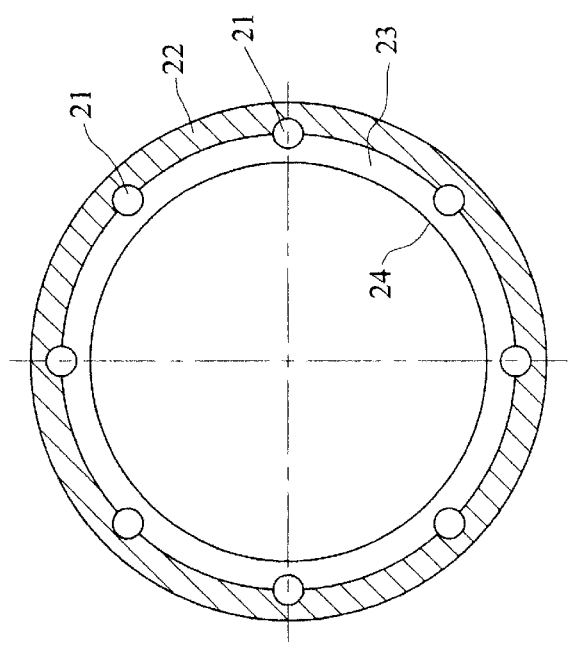
FIG. 1
FIG. 2
FIG. 3

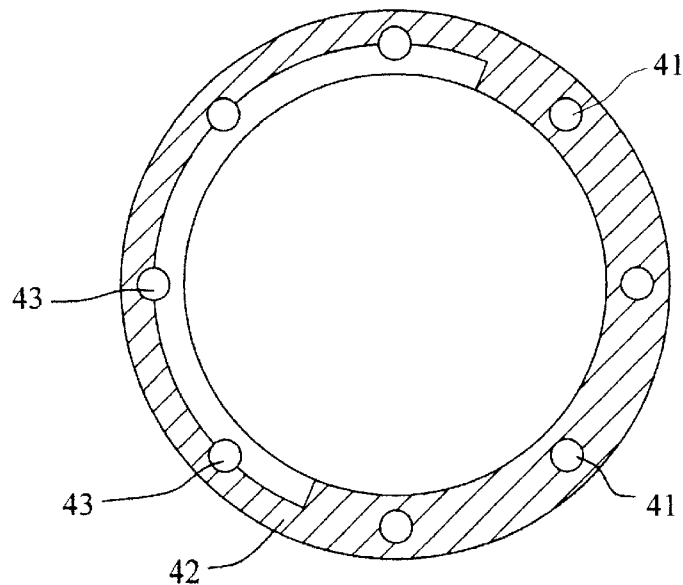
FIG. 4
FIG. 5
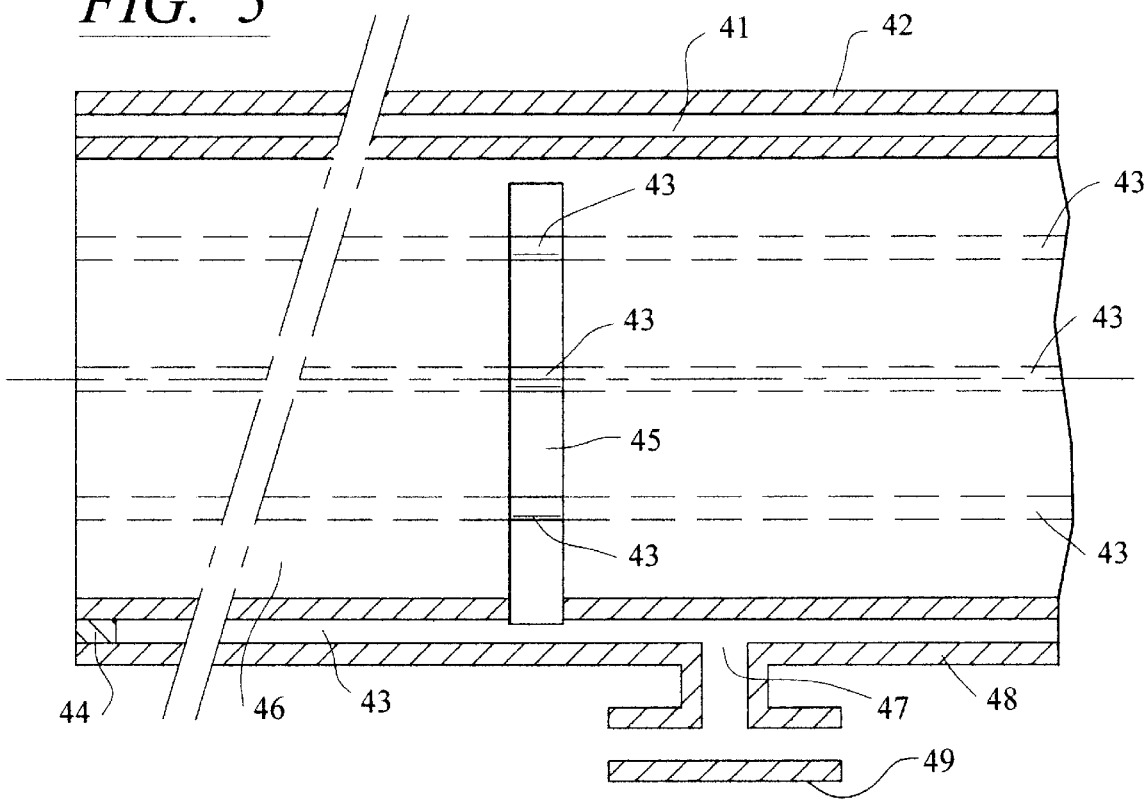

MEMBRANE FILTRATION MODULE AND MEMBRANE FILTRATION SYSTEM

TECHNICAL FIELD

The invention relates to a membrane filtration module, comprising a housing, a semi-permeable membrane, which is accommodated in the housing and has a liquid side for the introduction of liquid to be filtered and a concentrate side opposite the liquid side, as well as a permeate chamber, which surrounds the membrane and is in communication with a permeate-discharge line for discharging permeate.

PRIOR ART

A membrane filtration module of this kind is known in the art. In known membrane filtration systems, a plurality of modules are often disposed in series in a single housing of the system or parallel to one another. In a known system with modules connected in series, the housing has (radial) feed openings on either side for the purpose of feeding in the liquid to be filtered. The modules are disposed in an accurately fitting manner in the housing, with spaces, into which the concentrate flows out, present between the modules. These spaces also serve as liquid-feed chambers for a subsequent module, as seen in the direction of flow. The perforated permeate-discharge line extends centrally through each module and through the spaces, those parts of the permeate-discharge line which are situated in the spaces not having any perforations, or else the perforations in those parts being sealed off. This discharge line emerges axially outwards on both sides of the housing of the system. A semi-permeable membrane, such as a bundle of hollow fibres, a number of outside textile reinforced hollow fibre tubes or a membrane pattern wound into a spiral, is situated in the housing of the module. The permeate chamber is the chamber around the membrane, which is delimited by the housing. These known systems are used with membranes which are suitable for microfiltration, ultrafiltration, nanofiltration or for reverse osmosis.

It has been found that if the membrane consists of hollow fibres or small outside textile reinforced hollow fibre tubes with a smooth outer surface, the flow of liquid between the hollow fibres and/or outside textile reinforced hollow fibre tubes and/or through the perforations of the permeate-discharge line is inhibited as a result of the radial transport of permeate towards the central permeate discharge becoming increasingly strong towards the inside, resulting in a decrease in the filtering action of the system. For this reason, there are features in known modules for enhancing the radial transport of permeate. However, these features have the drawback that they are difficult to produce and take up space which could otherwise be used for fitting a membrane.

SUMMARY OF THE INVENTION

The object of the present invention is to provide a membrane filtration module which makes it possible to ensure efficient discharge of permeate in a simple manner and to overcome the abovementioned drawbacks.

The membrane filtration module of the type described above according to the invention is characterized in that the wall of the housing comprises one or more longitudinal channels which are closed towards the liquid side and the concentrate side and are in communication with the permeate chamber.

In the filter module according to the invention, the permeate can be discharged not only to the central permeate discharge but also towards the outer casing, where an additional collection and discharge of permeate is enabled. As a result, the radial transportation (directed from the outside inwards) of liquid through, for example, the bundle of fibres or outside textile reinforced hollow fibre tubes is considerably reduced, thus preventing the bundle from being pressed directly together and the flow of liquid from being impeded. Moreover, the entire internal volume of the housing remains available for accommodating the membrane, so that the effective membrane surface is not reduced by the presence of the additional permeate channels. The housing is produced in the usual way from plastic or metal.

The invention also relates to a membrane filtration system having a liquid feed and a permeate discharge, which comprises one or more membrane filtration modules according to the invention.

BRIEF DESCRIPTION OF THE DRAWINGS

The invention will be explained below with reference to the following drawing, in which:

FIG. 1 shows a diagrammatic longitudinal section through a membrane filtration system having a plurality of membrane filtration modules according to the invention;

FIG. 2 shows a cross-section of the membrane filtration module illustrated in FIG. 1;

FIG. 3 shows a cross-section through another embodiment of a membrane filtration module according to the invention;

FIG. 4 shows a cross-section of an embodiment which has been modified further of a membrane filtration module according to the invention;

FIG. 5 shows a longitudinal section through the embodiment illustrated in FIG. 4 of a membrane filtration module according to the invention;

DETAILED DESCRIPTION OF THE PREFERRED EMBODIMENTS

Figure 6:
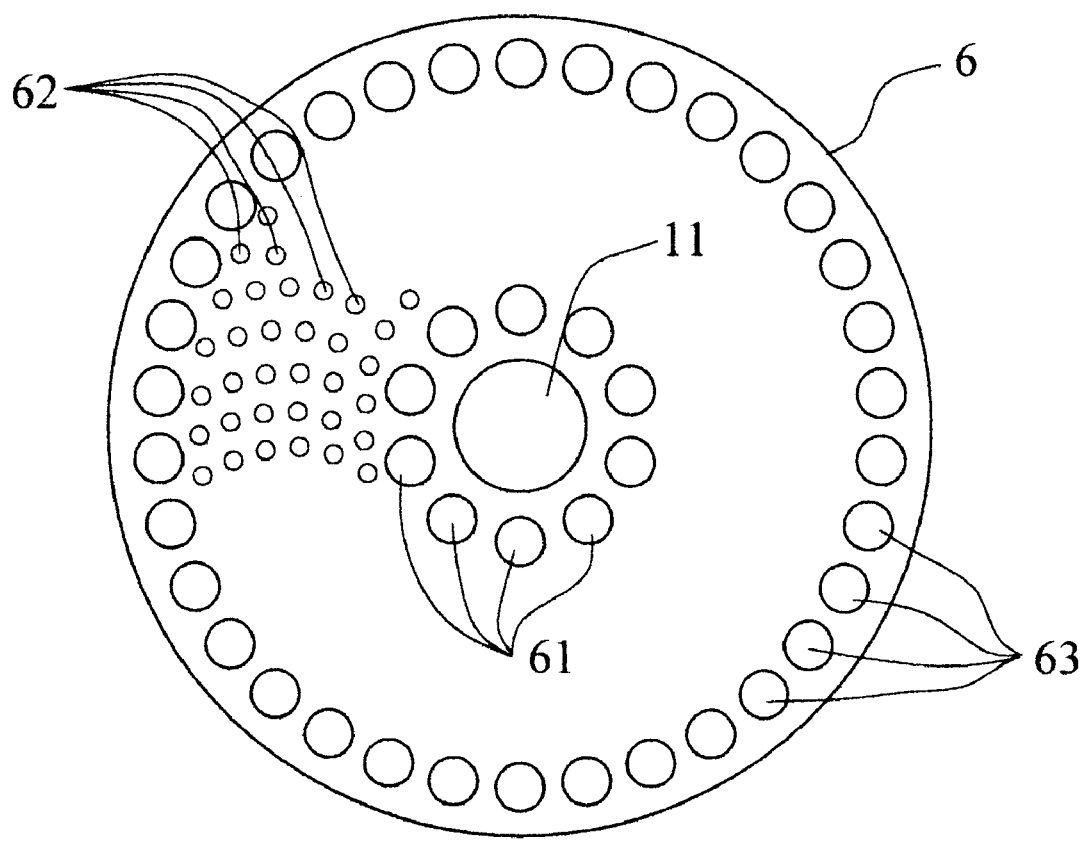
FIG. 6 shows a cross-section through another embodiment of a membrane filtration module according to the invention.

The additional permeate channels may be internal wall channels communicating with the permeate chamber at certain positions, for example partly circumferential groove(s) produced in the inner wall of the housing. In this case flow of permeate to the permeate channels is allowed at said positions. However, the permeate channels can also be in the form of longitudinal recesses in the inner wall of the housing, which are open to the permeate chamber over their full length.

According to a prefered embodiment the module of the invention comprises one such a channel positioned at the top of the module, which channel is connected to the permeate-discharge line via one or more connecting lines. This position of the channel allows for the easy removal of air contained in the module during the start up, as well as the removal of air contained in the liquid to be filtered during operation. The above connection lines are disposed at a distance from one another, viewed in the longitudinal direction of the module. Advantageously the inner wall of the housing, as well as the inner wall of said channel is not flat, but instead thereof it is corrugated, e.g. having the shape of alternating radial ribs and recesses, or similarly roughened to provide an uneven surface such that the membrane is prevented from sealing by the inner wall. Furthermore such a corrugated inner wall provides more strength than the "WAVIHOL" tube to be discussed hereinbelow.

Preferably the cross-section area of the channel disposed at the top is the same as that of the permeate discharge line. Likewise the total cross-section area of the connecting lines is equal to the cross-section of the permeate-discharge line.

An important advantage of a housing with internal wall channels made of plastic is that a housing of this kind can be produced easily using suitable extrusion techniques (cf. for example NL-A-7500368), and can be processed further using simple techniques in order to form the connection between the channels and the interior. In addition, a product of this kind with channels which are closed towards the inside is already commercially available as a standard tube in standard dimensions suitable for use as a module housing. However, in this case the cavities in the wall do not act as flow channels for the passage of a liquid, but rather they are provided in order to reduce the weight. An example is (PVC) tubes, which are marketed by Wavin under the brandname "WAVIHOL". The dimensions of these cavities are sufficiently large to serve as permeate channels. The shape, number and position of the channels in the wall of the housing are not critical. Round, square, rectangular, hexagonal and oval shapes are some of the possibilities. Usually, a plurality of channels are present, which are distributed evenly over the wall. The connection between the channels and the interior can easily be produced in the known tube, for example by milling open part of the inner wall or drilling into this wall as far as the channels. If the channels are used as permeate channels, they are advantageously not in communication with the liquid side and concentrate side of the module, but rather are closed off towards the liquid side and concentrate side. In order to discharge the permeate situated in the channels further on, these channels are in communication with a permeate-discharge line at one or both ends, advantageously at the end situated on the concentrate side. If the total capacity of these permeate channels is sufficiently great, a central permeate-discharge line for the filtering action may even be superfluous. In that case, the channels are preferably in communication with a permeate-collection line, which is present outside the housing, via discharge openings in the outer wall of the housing. However, the presence of the central permeate-discharge line is advantageous for rinsing the module.

In a further embodiment of the membrane filtration module according to the invention, the wall of the housing also comprises one or more rinsing channels with openings at both ends. This embodiment is particularly suitable for use in a membrane filtration system with filtration modules connected in series within one housing.

During the filtration (separation, purification or concentration), contaminants from the liquid are deposited on the membrane and in the spaces, thus impairing the action of the system. In order to keep the filtering efficiency of a system of this kind at an acceptable level, the modules are rinsed periodically. During this rinsing operation, rinsing liquid is usually introduced via the permeate-discharge line into the modules, rinsing back through the membrane and into the spaces, in order to remove deposited contaminants. However, contaminants present in the spaces, the dimensions of which contaminants have grown, for example as a result of agglomeration to form particles of which at least one dimension is larger than the dimension of the opening in the fibres or small tubes of the membrane, will block the access to the membrane for contaminants of smaller dimensions, and it will thus be impossible to carry out an efficient rinsing operation. Moreover, these large agglomerates can themselves also not be removed from the system via the membrane.

In the embodiment described above, with a view to the rinsing operation one or more rinsing channels are arranged in the wall of the module housing itself, with the result that the whole of the interior of the housing is available for the semi-permeable membrane, so that the filtering action is not affected significantly by the presence of this rinsing channel or these rinsing channels. These rinsing channels form an open connection between the liquid side and the concentrate side of the module.

If the known tube is used as the module housing, these rinsing channels are already present and to form the permeate channels it is merely necessary to seal off a number of these channels at both ends, thereby producing connections between the cavities and the interior.

However, the presence of these rinsing channels is also beneficial during the actual filtering, since they equalize the pressure on either side of a module. In a membrane, a pressure drop occurs as a result of the axial transportation of liquid in the membrane, both during filtration and during rinsing. This pressure drop is a factor which limits the dimensions of the module, which must not be so large that the pressure in downstream parts of the membrane becomes so low that there is no, or scarcely any, filtration or rinsing back in those parts of the membrane. The rinsing channels, which form an open connection (bypass) between the two sides of a module, ensure that the hydrostatic pressure on both sides is evened out without a loss of effective membrane surface and the working pressure in the membrane becomes higher. As a result, it is also possible to increase the length of the module, thus providing an economic advantage.

To supplement the permeate channels which serve to prevent the above-described problem of the radial flow of liquid being impeded, a membrane can advantageously be used which comprises a first membrane component with a first diameter, as well as a second membrane component with a second diameter, the second diameter being greater than the first diameter. The membrane component with a relatively large diameter prevents the other membrane component from becoming tightly packed, and thus ensures the radial transportation of permeate. The membrane components of different diameters may be of the same type, for example fine and coarse hollow fibres or outside textile reinforced hollow fibre tubes with different diameters. Combinations of different types are also possible, for example hollow fibres as the membrane component of small diameter and outside textile reinforced hollow fibre tubes and/or textile-reinforced capillaries as the second membrane component of relatively large diameter. Advantageously, the diameter ratio between the first membrane component and the second membrane component is at least 1:2. In a preferred embodiment of the filtration module according to the invention, the membrane comprises bundles of hollow fibres and outside textile reinforced hollow fibre tubes. A preferred position for the second membrane component is around the circumference of a central permeate-discharge line. According to another advantageous embodiment, the membrane component of relatively large diameter is (also) disposed in the region of the inner wall of the housing of the module. This latter embodiment is advantageously used if the wall of the housing comprises the abovementioned permeate channels. Arrangements of this kind can be realized in a technically relatively simple manner.

FIG. 1 shows a diagrammatic section through a membrane filtration system 1. This system 1 comprises a housing 2 with radial liquid-feed openings 3 and 4 in the region of both its ends, which liquid-feed openings may also serve as, optionally intermittent, rinsing-liquid discharge openings. Three membrane filtration modules are disposed in an accurately fitting manner in the housing 2 of the system 1 illustrated, the two outer modules of which are denoted by reference numeral 5 and the central module of which is denoted by reference numeral 5'. Each module 5 comprises a housing 6, the structure of which will be explained in more detail below with reference to the other figures. A semi-permeable membrane 7, for example a bundle of hollow fibres or a number of outside textile reinforced hollow fibre tubes (illustrated by thin horizontal lines) is situated in the housing 6. The liquid side of the membrane is indicated by reference numeral 8, and the concentrate side by reference numeral 9. During filtration, a liquid, which is to be filtered and is fed via the liquid-feed openings 3 and 4, is separated in the module 5 into a permeate, which passes through the membrane 7 and into a permeate chamber 10, and a concentrate, which does not pass through the membrane 7. The permeate flows out of the permeate chamber 10 and into a permeate-discharge line 11, which is partially provided with perforations. The permeate from all the modules 5 is collected in this line 11 and then discharged at one or both ends of the system 1. The concentrate flows out of the filter modules 5 into spaces 12 and 13 and then into the central membrane filtration module 5' for further separation, after which it is removed from the system 1 by being rinsed back via the concentrate discharge. The ends of the membrane 7 are fixed in the housing 6 in a manner known per se.

As described above, there is a risk that during filtration the hollow fibres or outside textile reinforced hollow fibre tubes of the membrane will be pressed against one another and against a permeate-discharge line in such a way that liquid flow of the permeate in the module is impeded.

According to the invention, the housing 6 of the modules 5 and 5' comprises one or more permeate channels 21, which are present in the wall 22 of the housing 6. These channels 21 are in open communication with the permeate chamber 10 and are closed off on the liquid side and concentrate side of the module, so that the liquid to be purified cannot flow directly into the permeate channels 21. See FIG. 2. In the embodiment illustrated in this figure, this open connection is formed by a groove 23, which is arranged over the entire circumference of the inner wall 24 of the housing. If the flow of permeate through the permeate-discharge line is blocked or impeded, the permeate can flow out through the permeate channels 21. On the concentrate side, the permeate channels 21 open out into a connecting piece (not shown) which is coupled to the central permeate-discharge line.

Over the course of time, the membrane 7 will become so contaminated that it needs to be rinsed. To this end, rinsing liquid is fed to the permeate-discharge line 11, which liquid flows, through the perforations in this line, into the permeate chamber 10 and, via the membrane 7, both towards the spaces 12 and 13 and the liquid-feed openings 3 and 4. Contaminants of dimensions larger than the openings in the membrane which have accumulated in the spaces 12 and 13 cannot, however, be removed via the membrane 7, since this dirt is too large and will also block the access to the membrane 7 of smaller dirt particles.

In the filtration module according to the invention, their removal can advantageously take place with the aid of rinsing channels 31 (cf. FIG. 3), which, like the permeate channels 32, are present in the wall 33 of the housing 6 of the modules 5. These channels 31 of sufficiently large dimensions connect the spaces 12 and 13 to the feed chambers on the other side (liquid side) of the membrane filtration modules 5. The rinsing liquid introduced entrains the large contaminants through these channels 31, resulting in efficient cleaning of the membrane filtration system. In the configuration illustrated in FIG. 3, the rinsing channels 31 and permeate channels 32 alternate. However, other configurations, such as in groups (FIG. 4), are also possible.

The required networks of lines with associated valves and pumps for the liquid to be filtered and the rinsing liquid are not illustrated in the drawing for reasons of simplicity. Furthermore, it should be noted that the drawing is not to scale.

A further modification of the wall of the housing is illustrated in FIG. 4 and 5. The housing 6 comprises rinsing channels 41 in the wall 42, which connect the liquid side to the concentrate side, as well as permeate channels 43, which are closed at both ends, for example by a plug 44. The channels of each type are in groups in the wall 42. To discharge permeate from the permeate chamber, a groove 45 is provided in the inner wall 46 of the housing 6. In the situation illustrated, this groove 45 extends over half the internal circumference and has a depth which reaches the permeate channels 43. Furthermore, the permeate channels 43 are in communication, via discharge openings 47 in the outer wall 48 of the housing 6, with a permeate-collection line 49, which is positioned around the housing 6. Only one groove 45 is shown in FIG. 5. However, a person skilled in the art will understand that there will usually be a plurality of grooves distributed along the length of the housing 6.

FIG. 6 shows a cross-section through a further embodiment of a module according to the invention. A number of outside textile reinforced hollow fibre tubes 61 are disposed around the central permeate-discharge line 11, in order to ensure the radial transportation of liquid from bundles of hollow fibres 62 towards the permeate-discharge line 11. If the wall of the module housing 6 also comprises permeate channels (not shown), outside textile reinforced hollow fibre tubes 63 are advantageously also disposed in the region of the inner wall of the housing 6, in order to ensure transportation of liquid towards these permeate channels. The diameter of the outside textile reinforced hollow fibre tubes is relatively large (approximately 5 mm) by comparison with that of the bundle of hollow fibres, thus preventing them from being packed tightly together, which is the cause of radial liquid blockage. Furthermore, these outside textile reinforced hollow fibre tubes 61 and 63 of large diameter contribute to the equalization of the pressure on either side of the module and to the removal of accumulated contaminants from the space by means of rinsing.

Figure 8:
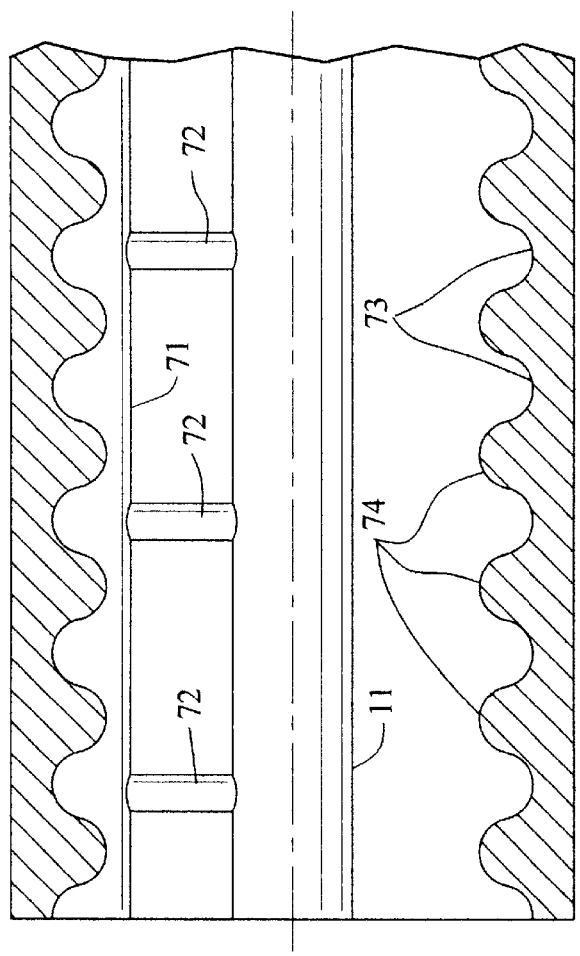
FIG. 8 shows a longitudinal section of the module of FIG. 7.
Figure 7:
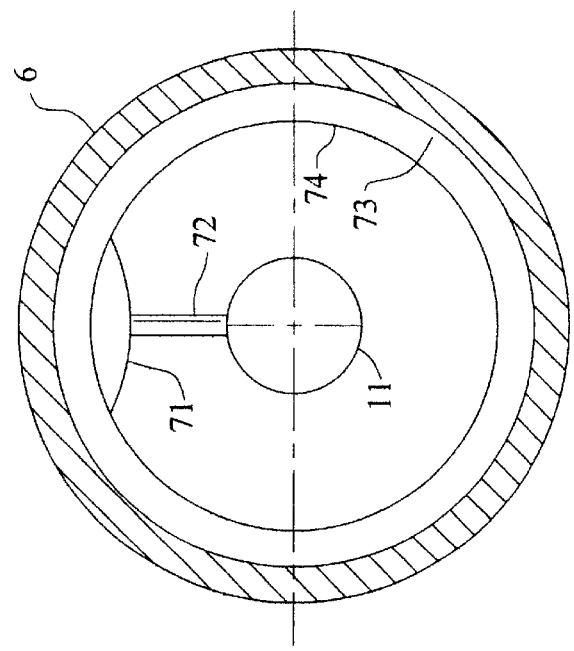
FIG. 7 shows a cross-section through yet another embodiment of a membrane filtration module according to the invention.

In the embodiment according to FIG. 7 and 8 the module according to the invention has one additional permeate channel 71 by means of a half cylindrical pipe, which is connected to the centrally disposed permeate-discharge line 11 via connecting lines 72. As is apparent from FIG. 8, the inner wall of the housing 6 has a corrugated shape, thereby providing a number of circumferential grooves 73 alternated by ribs 74.

Instead of the channel 71 an additional permeate channel can be produced in the corrugated inner surface of the housing in the form of a longitudinal groove by removing a part of the ribs 74 to the depth of the grooves 73. In order to direct the flow of permeate collected in the grooves 73 to a particular connecting line it is not necessary to modify all ribs 74, but instead thereof one could subdivide the longitudinal groove into several sections which are separated from each other by an unmodified rib. The ribs could take the form of a spiral like an internal thread.

What is claimed is:

1. Membrane filtration module, comprising:

a housing having a wall;

a semi-permeable membrane accommodated in the housing, the semi-permeable membrane being selected from the group consisting of hollow fibers, textile reinforced hollow fiber tubes and textile reinforced capillaries; and having a liquid side for the introduction of liquid to be filtered; and a concentrate side opposite the liquid side; and having a permeate chamber surrounding the membrane and is in communication with a permeate-discharge line for discharging permeate;

and wherein said wall comprises one or more channels, the one or more channels being closed towards the liquid and concentrate side, and wherein the one or more channels are in communication with the permeate chamber.

2. Module according to claim 1, wherein the wall of the housing has an inner surface, which is provided with a groove, the depth of which reaches as far as the channels.

3. Module according to claim 1, wherein one channel is arranged at the top of the inner wall of the module, which channel is connected to the permeate-discharge line by one or more connecting lines.

4. Module according to claim 1, wherein the surface of the inner wall of the housing comprises alternating radial ribs and recesses.

5. Module according to claim 1, wherein the wall of the housing has an outer surface, and wherein the channels are in communication with a permeate-collection line, which is present outside the housing, via discharge openings in the outer surface of the wall of the housing.

6. Module according to claim 1, wherein the wall of the housing also comprises one or more rinsing channels with openings at both end sides.

7. Module according to claim 1, wherein the membrane comprises a first membrane component with a first diameter as well as a second membrane component with a second diameter, the second diameter being greater than the first diameter.

8. Module according to claim 7, wherein outside textile reinforced hollow fibre tubes of large diameter and bundles of hollow fibers are disposed in the permeate chamber.

9. Module according to claim 7, wherein the second membrane component is disposed around the circumference of the permeate-discharge line.

10. Module according to claim 7, wherein the wall has an inner surface and the second membrane component is disposed in the region of the inner surface of the wall of the housing.

11. Membrane filtration system having a liquid feed and a permeate discharge, as well as at least one membrane filtration module, wherein the system comprises a membrane filtration module according to claim 1.

* * * * *